United States Patent
Srinivas et al.

(10) Patent No.: US 9,122,753 B2
(45) Date of Patent: Sep. 1, 2015

(54) METHOD AND APPARATUS FOR RETRIEVING A SONG BY HUMMED QUERY

(75) Inventors: A. Srinivas, Hyderabad (IN); P. Krishnamoorthy, Bangalore (IN); Rajen Bhatt, Rajkot (IN); Sarvesh Kumar, Noida (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 774 days.

(21) Appl. No.: 13/444,566

(22) Filed: Apr. 11, 2012

(65) Prior Publication Data

US 2012/0259637 A1    Oct. 11, 2012

(30) Foreign Application Priority Data

Apr. 11, 2011   (IN) .......................... 1247/CHE/2011
Sep. 23, 2011   (KR) ....................... 10-2011-0096209

(51) Int. Cl.
  *A63H 5/00*      (2006.01)
  *G04B 13/00*     (2006.01)
  *G10H 7/00*      (2006.01)
  *G06F 17/30*     (2006.01)
  *G10L 25/90*     (2013.01)

(52) U.S. Cl.
  CPC ..... *G06F 17/30758* (2013.01); *G10L 2025/906* (2013.01)

(58) Field of Classification Search
  CPC ............ G06F 17/30758; A01B 12/006; G10L 2025/906
  USPC ........................................................ 84/609
  See application file for complete search history.

(56) References Cited

U.S. PATENT DOCUMENTS

| | | | |
|---|---|---|---|
| 5,874,686 A | 2/1999 | Ghias et al. | |
| 7,378,588 B1* | 5/2008 | Changfan | ..................... 84/616 |
| 7,680,788 B2 | 3/2010 | Woo | |
| 7,788,279 B2 | 8/2010 | Mohajer et al. | |
| 7,962,530 B1* | 6/2011 | Kolta | ............................. 707/805 |
| 2002/0181711 A1* | 12/2002 | Logan et al. | ..................... 381/1 |
| 2004/0093354 A1 | 5/2004 | Xu et al. | |
| 2005/0086052 A1 | 4/2005 | Shih | |
| 2006/0253433 A1 | 11/2006 | Kim et al. | |
| 2007/0162497 A1* | 7/2007 | Pauws | ........................ 707/104.1 |
| 2007/0163425 A1* | 7/2007 | Tsui et al. | ....................... 84/609 |

(Continued)

OTHER PUBLICATIONS

Ghias et al. "Query by humming: musical information retrieval in an audio database," in Proceedings of the third ACM international conference on Multimedia, 1995, pp. 231-236.

(Continued)

*Primary Examiner* — Jeffrey Donels
(74) *Attorney, Agent, or Firm* — Sughrue Mion, PLLC

(57) ABSTRACT

An electronic apparatus and method for retrieving a song, and a storage medium. The electronic apparatus includes: a storage unit which stores a plurality of songs; a user input unit which receives a hummed query which is inputted for retrieving a song; and a song retrieving unit which retrieves a song based on the hummed query from among the plurality of stored songs when the hummed query is received. The song retrieving unit extracts a pitch and a duration of the hummed query, converts each of the extracted pitch and duration into multi-level symbols, calculates a string edit distance between the hummed query and one of the plurality of songs based on the symbols, and determines a similarity between the hummed query and a song based on edit operations which are performed within the calculated string edit distance.

23 Claims, 7 Drawing Sheets

(56) References Cited

U.S. PATENT DOCUMENTS

| | | | | |
|---|---|---|---|---|
| 2008/0017017 | A1* | 1/2008 | Zhu | 84/609 |
| 2011/0154977 | A1* | 6/2011 | Jeon et al. | 84/609 |

OTHER PUBLICATIONS

Kosugi et al. "A practical query-by-humming system for a large music database," in Proceedings of the eighth ACM international conference on Multimedia, Marina del Rey, California, United States, 2000, pp. 333-342.

Chen et al. "Query by music segments: An efficient approach for song retrieval," in Proc. of IEEE International Conference on Multimedia and Expo., 2000.

Pauws. "Cuby hum: A fully operational query-by-humming system," in ISMIR 2002 Conference Proceedings, Paris: IRCAM, 2001, pp. 187-196.

Lu et al. "A new approach to query by humming in music retrieval," in IEEE International Conference on Multimedia and Expo., 2001.

Song et al. "Query by humming: matching humming query to polyphonic audio," in Proceedings of IEEE International Conference on Multimedia and Expo, vol. 1, 2002, pp. 329-332.

Zhu et al. "Similarity matching of continuous melody contours for humming querying of melody databases," in International Workshop on Multimedia Signal Processing, 2002.

Zhu et al. "A robust music retrieval method for query-by-humming," in International Conference on Information Technology: Research and Education, 2003.

Zhu et al. "Robust and efficient pitch tracking for query-by-humming," in Proceedings of the 2003 Joint Conference of the Fourth International Conference on Information, Communications and Signal Processing, vol. 3, 15-18 2003.

Raju et al. "TANSEN: A query-by-humming based music retrieval system," in National Conference on Communications, IIT Madras, Jan. 31-Feb. 2, 2003.

Batke et al. "A query by humming system using mpeg-7 descriptors," in Proceedings of the 116th AES Conventition, 2004.

Dannenberg et al. "The MUSART testbed for query-by-humming evaluation," Comput. Music J., vol. 28, No. 2, 2004.

Kosugi et al. "Soundcompass: a practical query-by-humming system; normalization of scalable and shiftable time-series data and effective subsequence generation," in Proceedings of the 2004 ACM SIGMOD international conference on Management of data, Paris, France, 2004, pp. 881-886.

* cited by examiner

FIG. 6

| SONG | SIMILARITY |
|---|---|
| CANDIDATE-1 | 99% |
| CANDIDATE-2 | 90% |
| ⋮ | ⋮ |
| CANDIDATE-N | 10% |

METHOD AND APPARATUS FOR RETRIEVING A SONG BY HUMMED QUERY

CROSS-REFERENCE TO RELATED APPLICATIONS

This application claims priority from Indian Patent Application No. 1247/CHE/2011, filed on Apr. 11, 2011 in the Office of the Controller General of Patent, Designs & Trademarks of India, and claims priority from Korean Patent Application No. 10-2011-0096209, filed on Sep. 23, 2011 in the Korean Intellectual Property Office, the disclosures of which are incorporated herein by reference in their entireties.

BACKGROUND

1. Field

Apparatuses and methods consistent with the exemplary embodiments relate to the field of multimedia communications, and more particularly, to the field of multimedia content retrieval using human hummed queries as an input.

2. Description of the Related Art

Related art methods use text as an input query, with additional parameters (e.g., genre, artist, and/or film) as classification types, in order to obtain a desirable list of multimedia content. Using such a query model can be a difficult proposition, as relevant input criteria may be unknown and may be inexact. The result may be a list which includes multiple copies, or may not include the user's desired list. With a growing collection of songs in the database, the problem becomes compounded.

The text-based query methods are limiting, as the content retrieval of songs are subjected to a text value identification of each record for retrieval of an appropriate match. This inefficiency is addressed by the use of Query by Humming (QBH) systems. A QBH system performs a content-based retrieval by which the input content is searched in a database of songs and the matching content is found. The input could be in the form of a hummed melody of a desired song. By using the hummed melody, the song from the database that has a matching content is retrieved. The QBH system is a fast and effective method that retrieves the song match by only using the melody.

Recent works relating to QBH have focused on retrieving this list based on melody representations, similarity scores and pitch contours. Recently developed QBH models require a database which contains a manual hum or tag referring to the original music files. The QBH models for hand-held devices require a database which contains a manual hum or tag referring to the original music files that are stored in a server. The user query is then sent to the database in order to match the corresponding song. Accordingly, there is no specific matching solution available to port the same model into hand-held devices which yields an optimized feature extraction and pattern matching process. In addition, when finding a match, the search could result in the same similarity for common searched files.

SUMMARY

One or more exemplary embodiments may provide an efficient query method which can be applied for retrieval of information relating to a piece of music which is stored in a database. The comparison time required for comparing the user queried melodies with the songs listed in the database is reduced. The results and/or the comparison do not necessarily require a connection to the Internet. Further, the method and apparatus do not require a database which contains a manual hum or tag referring to the original music files. The aforementioned advantages can be realized by means of the features recited in the independent claims.

Exemplary embodiments of the present disclosure described herein provide a method and system for retrieving at least one song from a list of songs that matches the hummed query and/or melody.

An example of a method for the retrieval of songs from a multimedia database system containing melody descriptions of songs includes listing an index of melodic fragments from a given database containing songs by extracting pitch and duration vectors. The method also includes identifying the pitch estimation and note-onset location from a hummed query, wherein the pitch is estimated by using a short fixed interval. The method constructs a mid-level representation of pitch and note duration information, wherein the relationship between two notes is recorded. Finally, the method includes extracting the matching music compositions from the database module, wherein the match ranks the music compositions in a similarity order.

Each song in the database may have a respective melodic representation.

Pitch estimation may be performed by using a Fast Fourier Transform (FFT)-based autocorrelation.

Note-onset locations may be detected by using a detection function.

A mid-level representation of pitch may be based on a five-level representation. A mid-level representation of note duration may be based on a three-level representation.

A list of music compositions which is listed in a similarity order may be retrieved. The list may require a minimum number of string replacement operations in the optimal path.

In an exemplary embodiment, a system for retrieval of songs is provided. The system includes an electronic apparatus that has a processing segment for processing a Query-Based Hum (QBH). The system includes a processor which has a pre-processing unit for processing pulse code modulation (PCM), frequency, bits/sample and number of channels, and a total number of bytes included in the QBH. The processor also has an extraction unit for extracting pitch and note duration contours from the QBH. The processor also has a post-processing unit that processes extracted pitch and duration contours to form a mid-level representation in a symbolic manner. Finally, the processor has a similarity measuring unit for determining matching compositions with respect to the QBH from the database and for ranking the determined compositions in order of similarity.

The PCM data may be processed by: re-sampling frequency subject to a certain level; and normalizing frequency distribution, by discarding the frequencies that are below an average level.

Pitch information may be extracted by estimating the pitch of the QBH by using a Fast Fourier Transform (FFT)-based autocorrelation.

Note-onset location may be extracted by performing the following: identifying the note-onset location detection by using a peak-picking algorithm with respect to a detection function that is a product of a weight function and a power spectrum of QBH, wherein the weight function is derived by using a weighted spectral energy with a band-limiting filter response which has a value of either unity or zero, subjecting the detection function to a biphasic function (e.g., a first order Gaussian differentiator function), and setting a predetermined threshold value for detecting the peaks.

The post-processing unit may be used for processing pitch contour and note duration contour, and for listing a mid-level representation by using five levels for pitch contour and three levels for note duration contour.

The similarity measuring unit may perform a process that includes: identifying an optimal path from the QBH to a respective song location by using the string edit distance (SED); setting a cost for each operation involving one of substitution, replacement, insertion and deletion which is performed between source (i.e., query) and destination (i.e., database songs) strings; obtaining the minimum distance between the mid-level representation of database files and the query note sequence by equating the lowest cost during a comparison; and calculating a normalized string edit distance for all matches of source strings and destination strings by computing the unified cost for the total number of edit operations.

In an exemplary embodiment, an electronic apparatus includes: a storage unit which stores a plurality of songs; a user input unit which receives a hummed query which is inputted for retrieving a song; and a song retrieving unit which retrieves a song based on the hummed query from among the plurality of stored songs when the hummed query is. The song retrieving unit extracts a pitch and a duration of the hummed query, converts each of the extracted pitch and duration into multi-level symbols, calculates a string edit distance between the hummed query and one of the plurality of songs based on the symbols, and determines a similarity between the hummed query and a respective song based on one or more edit operations which are performed within the calculated string edit distance.

The song retrieving unit may convert the extracted pitch into 5-level symbols, and the song retrieving unit may convert the extracted duration into 3-level symbols.

The edit operations may include at least one of a substitution operation, a replacement operation, an insertion operation, and a deletion operation, and the song retrieving unit may determine the similarity between the hummed query and the respective song based on a number of edit operations which are performed within the edit distance.

The song retrieving unit may determine that a degree of the similarity between the hummed query and the respective song increases as more substitution operations are performed within the edit distance.

The song retrieving unit may determine that a degree of the similarity between the hummed query and the respective song decreases as more replacement, insertion or deletion operations are performed within the edit distance.

The storage unit may further store data relating to the multi-level symbols, into which the extracted pitch and the extracted duration are converted, which data is generated by the song retrieving unit as a result of processing performed upon the multi-level symbols.

The electronic apparatus may further include a display unit which displays at least one song retrieved by the song retrieving unit based on the determined similarity.

The electronic apparatus may further include a user interface generating unit which generates a user interface for facilitating user retrieval of at least one song.

In another exemplary embodiment, a method of retrieving a song by using an electronic apparatus includes: storing a plurality of songs; receiving an inputted hummed query for retrieving a song; extracting a pitch and a duration of the hummed query; converting each of the extracted pitch and the extracted duration into multi-level symbols; and calculating a string edit distance between the hummed query and one of the plurality of songs based on the converted symbols, and determining a similarity between the hummed query and a respective song based on one or more edit operations which are performed within the calculated string edit distance.

The conversion into the symbols may include converting the extracted pitch into 5-level symbols and converting the extracted duration into 3-level symbols.

The edit operations may include at least one of a substitution operation, a replacement operation, an insertion operation, and a deletion operation, and the determining the similarity between the hummed query and a respective song may include determining the similarity between the hummed query and the respective song based on a number of edit operations which are performed within the edit distance.

The determining the similarity between the hummed query and a respective song may include determining that a degree of the similarity between the hummed query and the respective song increases as more substitution operations are performed within the edit distance.

The determining the similarity between the hummed query and a respective song may include determining that a degree of the similarity between the hummed query and the respective song decreases as more replacement, insertion or deletion operations are performed within the edit distance.

The method may further include storing data relating to the multi-level symbols into which the extracted pitch and the extracted duration are converted.

The method may further include displaying at least one song retrieved based on the determined similarity.

The method may further include generating and displaying a user interface for facilitating user retrieval of at least one song.

In another exemplary embodiment, a non-transitory computer-readable recording medium which stores a program which includes computer-executable instructions for performing the foregoing method is provided.

BRIEF DESCRIPTION OF THE DRAWINGS

With respect to the accompanying figures, similar reference numerals may refer to identical or functionally similar elements. These reference numerals are used in the detailed description to illustrate various exemplary embodiments and to describe various aspects and advantages of the present disclosure.

FIG. 6 shows an exemplary embodiment of song-retrieved results obtained by using the electronic apparatus of FIG. 5.

Persons skilled in the art will appreciate that elements in the figures are illustrated for simplicity and clarity and may have not been drawn to scale. For example, the dimensions of some of the elements in the figures may be exaggerated relative to other elements to help to improve understanding of various exemplary embodiments which are described in the present disclosure.

DETAILED DESCRIPTION OF EXEMPLARY EMBODIMENTS

It should be observed that method steps and system components have been represented by conventional symbols in the figures, showing only specific details that are relevant for an understanding of the present disclosure. Further, details that may be readily apparent to person ordinarily skilled in the art may not have been described herein. In the present disclosure, relational terms such as primary and secondary, first and second, and the like, may be used to distinguish one entity from another entity, without necessarily implying any actual relationship or order between such entities.

Exemplary embodiments described herein provide a method and system for retrieving a list of songs that matches a hummed query and/or melody.

Figure 1:
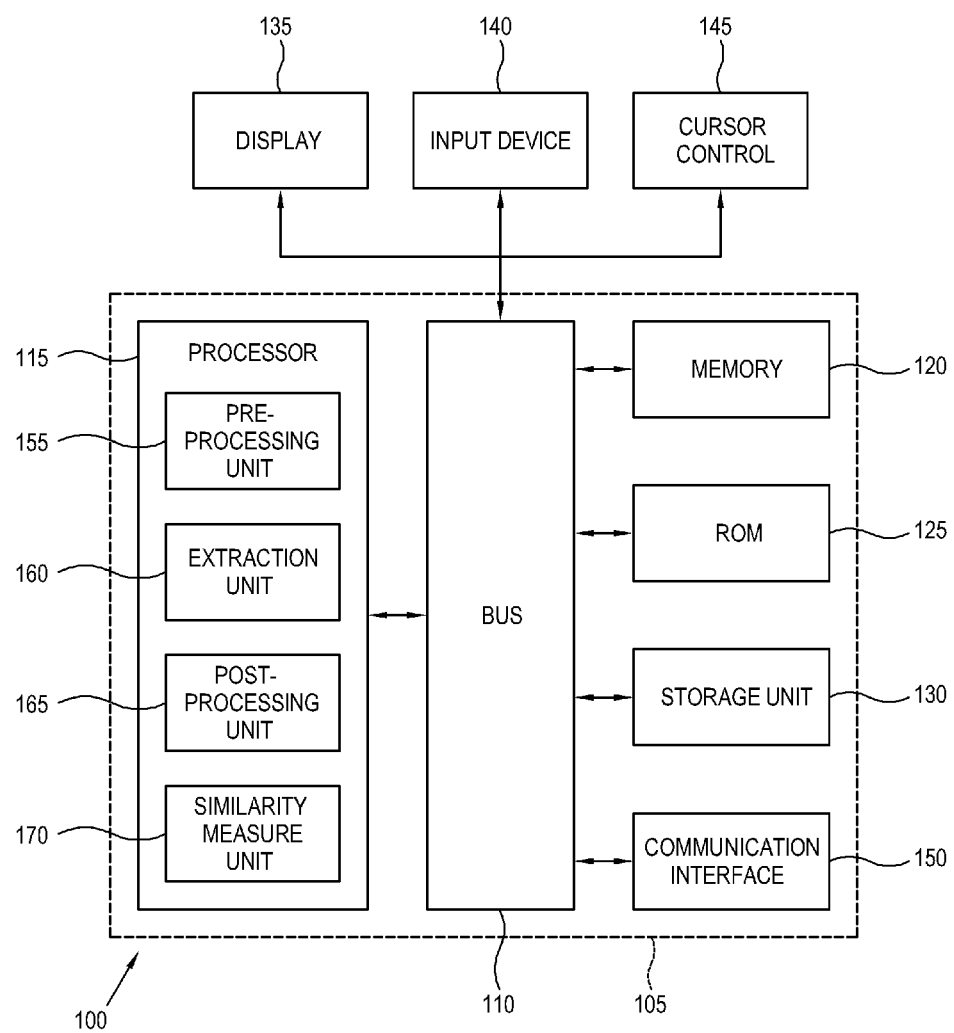
FIG. 1 is a block diagram of a system for retrieval of a music match from a database of songs, in accordance with which various exemplary embodiments can be implemented.

FIG. 1 is a block diagram of a system 100 for matching the hummed query and/or melody to a song. The system 100 includes an electronic apparatus 105. Examples of the electronic apparatus 105 may include, but are not limited to, one or more of the following: a computer, a laptop, a digital camera, a mobile device, a digital album, a digital television, a hand held device, a personal digital assistant (PDA), a camcorder, and a video player.

The electronic apparatus 105 includes a bus 110 for communicating information, and a processor 115, which is coupled with the bus 110, for processing information. The electronic apparatus 105 also includes a memory 120, such as, for example, a random access memory (RAM), which is coupled to the bus 110, for storing information as required by the processor 115. The memory 120 can be used for storing temporary information, as required by the processor 115. The electronic apparatus 105 further includes a read only memory (ROM) 125, which is coupled to the bus 110, for storing static information as required by the processor 115. A storage unit 130, such as, for example, a magnetic disk, hard disk or optical disk, can be provided and coupled to the bus 110 for storing information.

The electronic apparatus 105 can be coupled via the bus 110 to a display 135, such as, for example, a cathode ray tube (CRT) display or a liquid crystal display (LCD), which is used for displaying information. An input device 140 is coupled to the bus 110 for communicating information to the processor 115. In some exemplary embodiments, an external microphone may be used for communicating information to the processor.

In some exemplary embodiments, the operations described in the present disclosure are performed by the electronic apparatus 105 using the processor 115. The information can be read into the memory 120 from a machine-readable medium, such as, for example, the storage unit 130. In alternative exemplary embodiments, hard-wired circuitry can be used in place of or in combination with software instructions to implement various exemplary embodiments.

The term machine-readable medium can be defined as a medium which provides data to a machine to enable the machine to perform a specific function. The machine-readable medium can be a storage medium. Storage media can include non-volatile media and volatile media. For example, the storage unit 130 can include a non-volatile medium. The memory 120 can include a volatile medium. All such media must be tangible in order to enable the instructions carried by the respective medium to be detected by a physical mechanism that reads the instructions into the machine.

Examples of the machine readable medium may include, but are not limited to, a floppy disk, a flexible disk, a hard disk, a magnetic tape, a CD-ROM, an optical disk, punch cards, paper tape, a RAM, a PROM, EPROM, and a FLASH-EPROM.

In some exemplary embodiments, the processor 115 includes one or more processing units for performing one or more functions of the processor 115. The processing units may be embodied as hardware circuitry performing specified functions. The processor 115 processes a hummed query that is used for matching an item found in the database. The processor 115 includes a pre-processing unit 155 which extracts audio information, such as, for example, a sampling frequency, a number of bits/sample, a number of channels, and a total number of bytes, and Pulse-code modulation (PCM) data from the input query. The processor 115 also includes an extraction unit 160 for estimating a pitch and a note-onset location of the input melody. Further, the processor 115 includes a post-processing unit 165 which is configured to determine the pitch and duration contour levels for the input melody. Finally, the processor 115 includes a similarity measure unit 170 that compares a distance which is measured from the input query to each of the database songs for all traversed paths.

Figure 2:
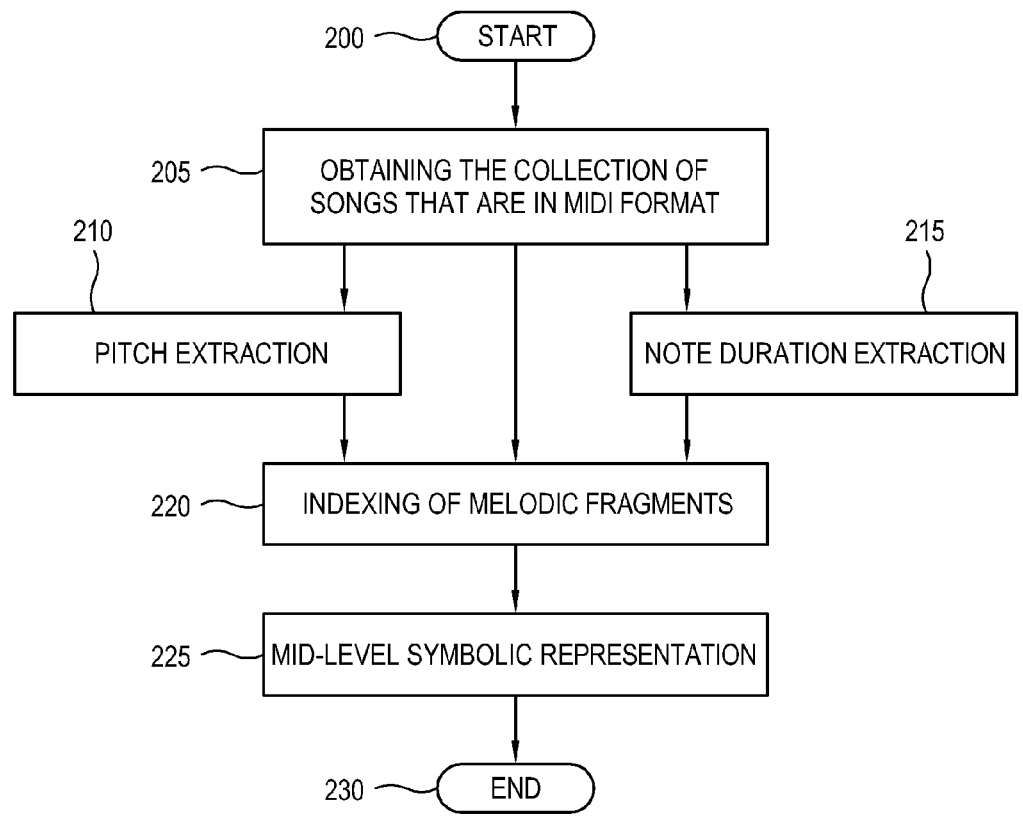
FIG. 2 is a flow chart which illustrates a method by which each of a collection of songs is converted into a symbolic format by using mid-level representation, in accordance with one or more exemplary embodiments.

FIG. 2 shows a flow chart which illustrates a method by which the songs that are in Musical Instrument Digital Interface (MIDI) format in the database are converted into symbolic representation, in accordance with one or more exemplary embodiments.

The method starts at operation 200.

At operation 205, a search is performed to collect the songs which are stored in the storage unit 130 and that are in MIDI format. At operation 210, the obtained collection is then sent to the pre-processing unit for pitch detection and pitch extraction.

At operation 215, the pre-processing unit 155 extracts a note duration from each of the obtained collection of songs.

At operation 220, using the resultant collection of MIDI files, an index is created for all the melodic fragments. These melodic fragments include a composition of pitch and note duration vectors.

At operation 225, the pitch frequency and duration of each note is extracted from the MIDI file and is converted into cents. Then, the obtained pitch contour is represented using five levels and the duration contour is represented by three levels. Table 1 depicts the universal data structure (UDS) conversion table for the pitch contour, and Table 2 depicts the conversion table for the duration contour. In Table 2, the value of Tm is equal to 0.5*[mean of duration (cents)]. The method ends at operation 230.

TABLE 1

| Change in Cents | Contour Representation |
| --- | --- |
| $c \leq -150$ | A |
| $-150 < c \leq -50$ | B |
| $-50 < c \leq 50$ | C |

TABLE 1-continued

| Change in Cents | Contour Representation |
|---|---|
| 50 < c ≤ 150 | D |
| c > 150 | E |

TABLE 2

| Change in Cents | Contour Representation |
|---|---|
| c ≤ −Tm | D |
| −Tm < c ≤ Tm | S |
| c > Tm | U |

Figure 3:
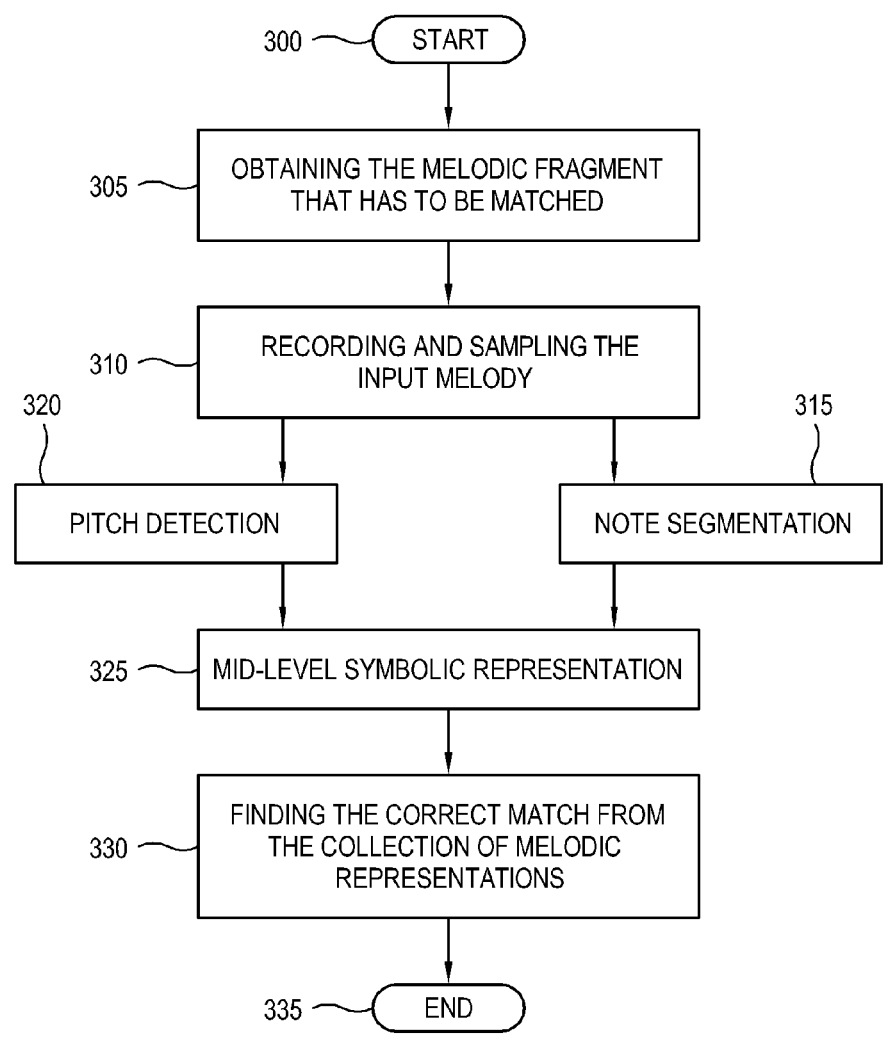
FIG. 3 is a flow chart which illustrates a method by which an input melody is subjected to a feature extraction to obtain the pitch and note duration contours which are converted into symbolic format using mid-level representation, in accordance with one or more exemplary embodiments.

FIG. 3 shows a flow chart which illustrates a method by which an input query, which is in the form of a melody, is represented in order to enable a search for a match in the database, in accordance with one or more exemplary embodiments.

The method starts at operation 300.

At operation 305, an input is received by the system 100. The received input is in the form of a melody or a melodic fragment of a desired song. The input may be received from a recording device, such as, for example, a microphone embedded in a handheld electronic apparatus such as a mobile phone or a music player. The melody or melodic fragment is in the form of a consonant ("Ta") query spoken or emitted into a microphone which is connected to, for example, any handheld device, such as a mobile phone or an MP3 players, or a personal computer, such as a desktop personal computer or a laptop personal computer.

At operation 310, the received input is recorded and then sent to the pre-processing unit 155 for extracting data, including, for example, a sampling frequency, a number of bits/sample and a number of channels, a total number of bytes, and PCM data. The input melody with its known sampling frequency is then subjected to a re-sampler which is included in the pre-processing unit 155 to resample the signal to 8 kHz. For the received input signal, the maximum amplitude is determined, and the frequencies that are below the average sampled value are discarded.

At operation 315, the re-sampled query is then transcribed into a time-frequency representation in which the fundamental frequency (i.e., pitch) of the audio is estimated at short fixed intervals. The extraction unit 160 performs a Fast Fourier Transform-based autocorrelation that estimates the frequency level of the pitch. At operation 320, the extraction unit 160 is used to identify the voiced segments from the PCM data derived from the received input query. The extraction unit 160 finds the onset locations of the PCM data by using a peak-picking algorithm which is applied to a detection function. The detection function is found by deriving a product of the weighting function and the power spectrum for an input hum. The weighted spectral energy of the input hum is used as an input to the weighting function that applies a band-limiting filter, thereby yielding a value as unity gain in the frequency region corresponding to (640, 2800 Hz) and falling off linearly to zero gain over a frequency region of 100 Hz on either side (i.e., from 640 Hz to 540 Hz and from 2800 Hz to 2900 Hz). The resultant detection function is then smoothed by using a biphasic function, such as, for example, a first order Gaussian differentiator, which has a length equal to 11 in one exemplary embodiment, and the peaks in the smoothed detection function which are lesser than the predefined threshold (which is equal to −0.2 in one exemplary embodiment) are determined as the note-onsets.

At operation 325, the post-processing unit 165 builds a relationship between a note and its neighbor. This relationship yields the mid-level representation. In particular, the post-processing unit 165 collects the note contour which is outputted from the mid-level representation and converts the collected note contour into symbolic form. In addition, the post-processing unit 165 determines the frequency and duration of each note based on pitch-tracking and note segmentation and converts the respective determined frequencies and durations into cents.

From the extracted pitch and note-onset information, the pitch and duration contour values are obtained. However, prior to obtaining the pitch and duration contour values, the pitch frequencies of each note are subjected to a median operation. The pitch contour is represented using five levels and the duration contour is represented by three levels. Tables 1 and 2, provided above, depict the respective conversion tables. In Table 2, the value of Tm is equal to 0.5*[mean of duration (cents)].

For all possible ranges, pitch contour is represented by five levels, and duration contour is represented by three levels.

At operation 330, the mid-level representation of the received input query is compared with each respective mid-level representation of the songs stored in the database, and a correct match is thereby determined. The method ends at operation 335.

Figure 4:
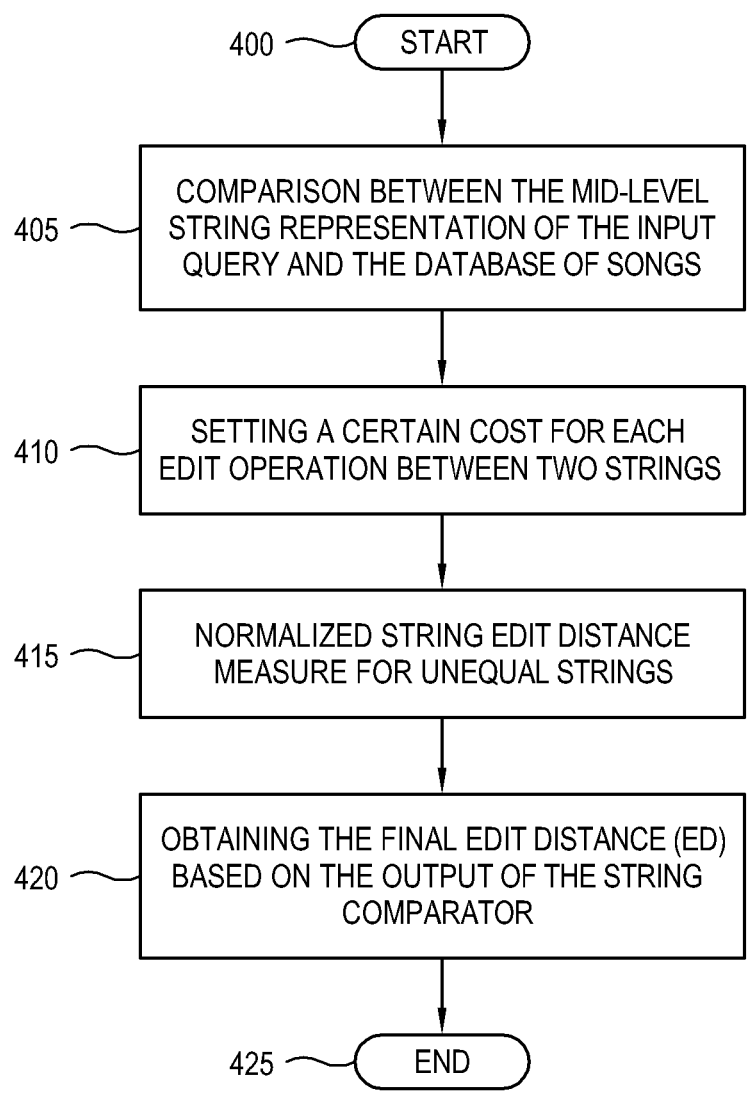
FIG. 4 is a flow chart which illustrates a comparison between source strings and destination strings to yield a cost which is then used in a normalized string edit measurement to obtain an optimal edit distance by which the correct melody segment is determined, in accordance with one or more exemplary embodiments.

FIG. 4 is a flow chart which illustrates a comparison between source strings and destination strings to yield a cost which is then used in a normalized string edit measurement to obtain an optimal edit distance by which a correct melody segment is determined, in accordance with one or more exemplary embodiments.

The method starts at operation 400.

At operation 405, the mid-level representation of the source query and the mid-level representation of each of the songs stored in the database are sent to the similarity measure unit 170 for comparison. Each of the mid-level representations is provided in a string format.

At operation 410, the String Edit Distance (SED) is calculated by evaluating the minimum edit operations required to match a source string to a destination string. The edit operations which may be performed between the source string and the destination string include one or more of a substitution operation, a replacement operation, an insertion operation, and a deletion operation. For each such operation, there is an associated cost. For purposes of description, the following example assumes that there are two strings P and Q, and "i" denotes a position which is under consideration with respect to string P, and "j" denotes a position which is under consideration with respect to string Q.

A substitution operation is performed when values at the two positions of strings, i.e., P(i) and Q(j), are same. For P(i)=Q(j), the operational cost is set to zero.

The replacement, insertion and/or deletion operations are performed when values at P(i) and Q(j) are different, i.e., P(i)≠Q(j); the operational cost is set to one.

An insertion operation is performed on a source string which is shorter than the corresponding destination string. The operational cost for the insertion operation is set to one.

A deletion operation is performed on a source string which is longer than the corresponding destination string. The operational cost for the deletion operation is set to one.

All paths from the source to destination and the minimum edit distance are determined by traversing the optimal path as derived from the sequence of all of the edit operations.

In the case of longer and shorter string matching, prior to performing the string matching, an optimal path for general minimum edit distance is tracked, and the number of replacement, substitution, deletion and insertion operations is counted in that optimal path. Generally, the total number of replacement, substitution, deletion and insertion operations will be equal to the length of the optimal path. In an evaluation of an edit distance, a substitution operation signifies that strings are matching, while replacement, insertion and deletion operations signify that there is some amount of mismatch between the strings. Hence, a relatively greater number of substitutions implies that the corresponding strings are more equivalent to each other. Conversely, a greater number of replacements implies that the corresponding strings are mismatching with each other.

At operation 415, a string distance evaluation between two unequal strings, a normalized edit distance (NED) is calculated as follows:

$$D_n = \frac{D(N_1, N_2) \times N_R}{\min(N_1, N_2)}$$

where D(N1, N2) is the basic NED measure between source string P of length N1 and destination string Q of length N2, and NR refers to the number of replacement operations in the optimal path. In particular, the number of replacement operations is considered as representing the amount of mismatch between two strings. For normalization, the measure is then divided by the length of the shorter string.

The Dn value is computed for each of the pitch contour, Dnp, and the duration contour, Dnn, separately, and these two values are combined to obtain the final Edit Distance (ED) at operation 420. The final ED is computed as $$ED = 0.75 \times D_{np} + 0.25 \times D_{nn}$$

The list of songs which are retrieved from the database module based on the output of string comparator is then displayed. The method ends at operation 425.

In the preceding portion of the specification, the present disclosure and its advantages have been described with reference to specific exemplary embodiments. However, it will be apparent to a person of ordinary skill in the art that various modifications and changes can be made, without departing from the scope of the present disclosure, as set forth in the claims below. Accordingly, the specification and figures are to be regarded as illustrative examples of the present disclosure, rather than in a restrictive sense. All such possible modifications are intended to be included within the scope of the present disclosure.

Figure 5:
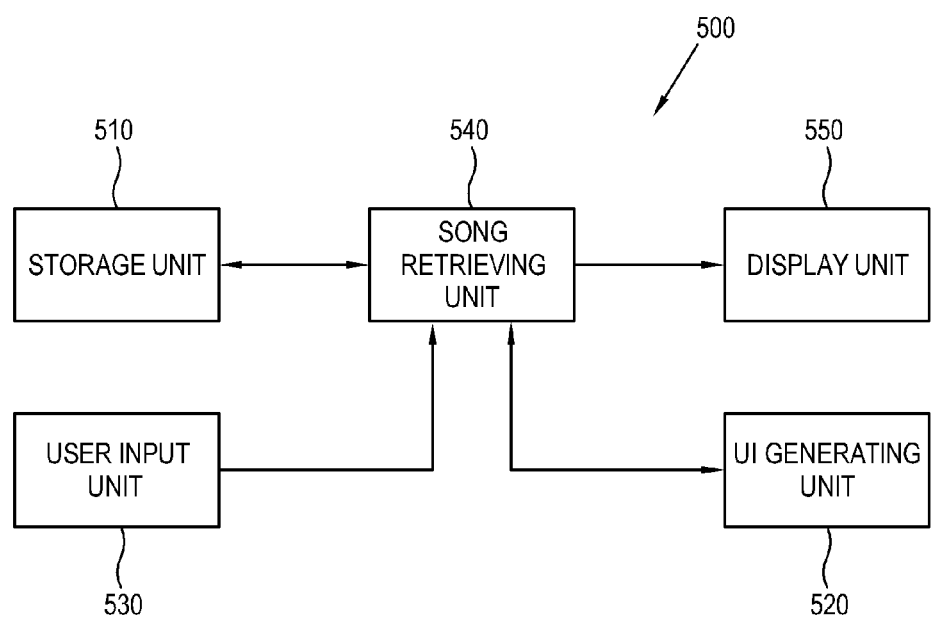
FIG. 5 is a control block diagram of an electronic apparatus for retrieving songs according to another exemplary embodiment.

FIG. 5 is a control block diagram of an electronic apparatus for retrieving a song, according to another exemplary embodiment.

An electronic apparatus 500 includes a storage unit 510, a user interface (UI) generating unit 520, a user input unit 530, a song retrieving unit 540, and a display unit 550.

The electronic apparatus 500 may include any type of electronic apparatus which is usable for audio reproduction, and the electronic apparatus 500 may be similar to an example of the electronic apparatus 105 of FIG. 1. For example, the electronic apparatus 500 may include a portable electronic apparatus such as an MP3 player, a smart phone, or a portable multimedia player (PMP), and a display device such as a digital television (DTV), an Internet protocol television (IPTV), a personal computer (PC), a laptop computer, or a tablet PC.

The storage unit 510 stores a plurality of songs. In addition, the storage unit 510 further stores data relating to the multi-level symbols, into which the pitch and duration which are extracted from each respective one of the plurality of songs are converted, which data is generated by the song retrieving unit 540 as a result of processing performed on the multi-level symbols. Thus, the data is used for retrieving the songs based on a determined similarity to the hummed query which is inputted via the user input unit 530.

The UI generating unit 520 generates a user interface (UI) for facilitating user retrieval of one or more songs. If a particular key is inputted via the user input unit 530, the UI generating unit 520 generates the song retrieving UI to be displayed on the display unit 550. The generated UI may be provided in the form of a graphical user interface (GUI).

The user input unit 530 is a user interface for receiving input from a user, such as, for example, a user selection in relation to a function or operation performed by the electronic apparatus 500. The user input unit 530 may include at least one key button, and may be provided as a control panel or a touch panel in the electronic apparatus 500. Further, the user input unit 530 may be provided in the form of a remote controller, a keyboard, or a mouse which is connected to the electronic apparatus 500 via either a wired connection or a wireless connection. In addition, the user input unit 530 may further include a microphone that can receive the hummed query for retrieving the songs from a user.

The song retrieving unit 540 extracts the pitch and duration of the hummed query which is received via the user input unit 530, and converts each of the extracted pitch and duration into multi-level symbols, calculates the string edit distance between the hummed query and a respective one of the plurality of songs based on the converted symbols, and determines a similarity between the hummed query and the respective song based on one or more edit operations which are performed within the calculated string edit distance, thereby retrieving the songs based on a determined similarity with respect to the hummed query.

According to an exemplary embodiment, the song retrieving unit 540 performs almost the same or similar function as that performed by the processor 115 of FIG. 1. Thus, the song retrieving unit 540 may also include a pre-processing unit (not shown) which extracts the audio information (e.g., a sampling frequency, a number of bits/sample and a number of channels, and a total number of bytes) and Pulse-code modulation (PCM) data from the hummed query, an extraction unit (not shown) for estimating the pitch and the note-onset location of the hummed query, a post-processing module (not shown) for determining the contour levels of the extracted pitch and duration, and a similarity measurement module (not shown) that compares the distance measured from the input query to each respective one of the songs stored in the storage unit 510. The functions of the foregoing elements were described in detail with reference to FIGS. 1 to 4, and therefore repetitive descriptions thereof will be omitted.

The display unit 550 may display at least one song retrieved by the song retrieving unit 540 based on the determined similarity. FIG. 6 shows an exemplary embodiment of song-retrieved results as displayed by the electronic apparatus 500 of FIG. 5. Referring to FIG. 6, songs corresponding to candidates 1 to N are retrieved from the plurality of stored songs based on the respective determined similarities of the songs retrieved by the retrieving unit 540, and the respective similarity of each of the candidates 1 to N is displayed together, thereby enhancing a user's convenience.

Accordingly, the electronic apparatus 500 according to an exemplary embodiment can retrieve the songs based on a determined similarity with respect to the hummed query by using the hummed query provided by a user without using another interface, from among the plurality of songs stored in the electronic apparatus 500, thereby enhancing a user's convenience.

Further, the electronic apparatus 500 according to an exemplary embodiment can readily retrieve the songs which are desired to be reproduced by a user, from among the plurality of songs stored in the electronic apparatus 500, by using the hummed query, even though the apparatus 500 is not connected to the Internet, thereby enhancing a user's convenience.

Figure 7:
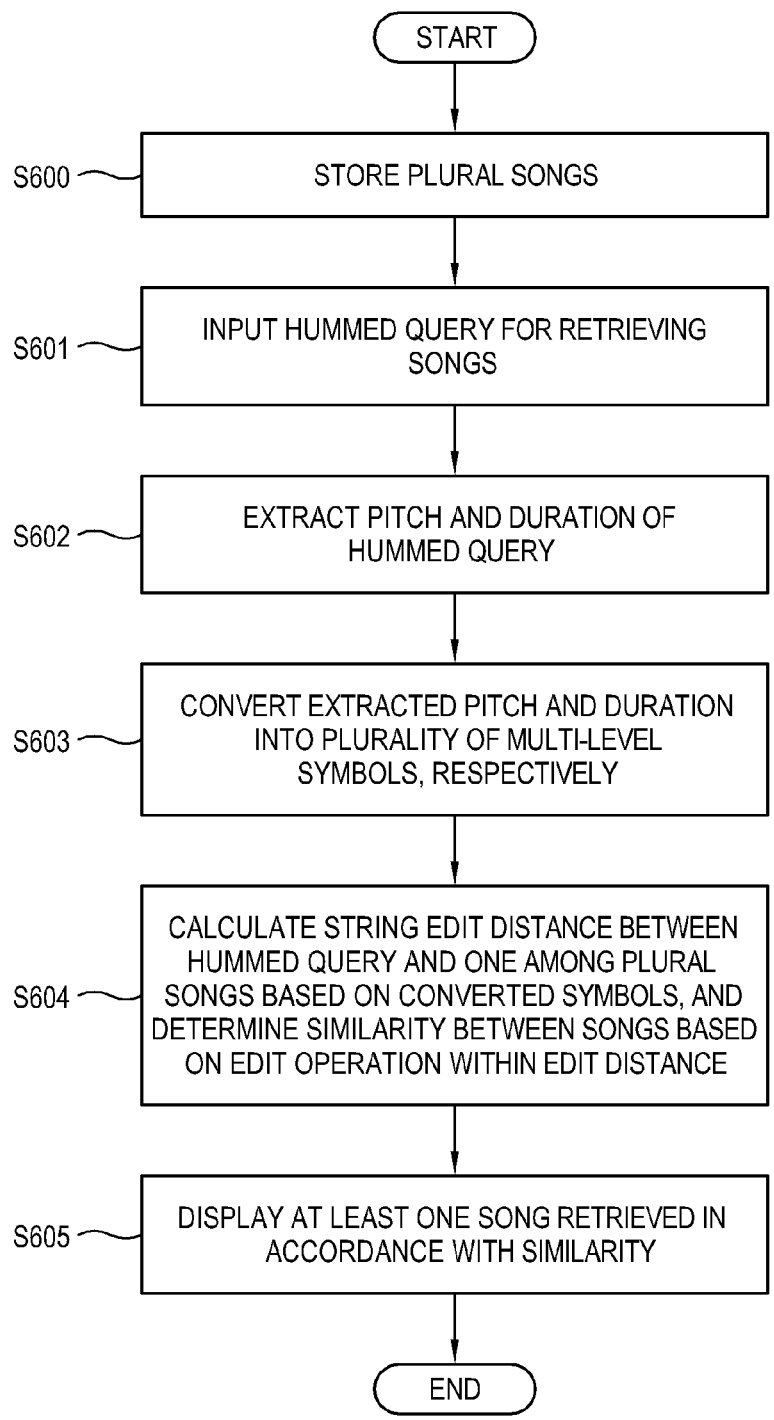
FIG. 7 is a flow chart which illustrates a song-retrieving method performed by using the electronic apparatus of FIG. 5.

FIG. 7 is a flow chart which illustrates a song retrieving method performed by using the electronic apparatus of FIG. 5, in accordance with one or more exemplary embodiments.

As shown in FIG. 7, the song retrieving method performed by using the electronic apparatus 500 includes storing the plurality of songs in the storage unit 510 at step S600. In addition, the method may further include storing data relating to the multi-level symbols into which the respective pitch and duration which are extracted from each of the plurality of songs are converted.

At step S601, the hummed query for retrieving the songs is inputted by a user via the user input unit 530. In addition, the method may further include generating and displaying a user interface for retrieving the songs.

After the hummed query is inputted and received, at step S602, the song retrieving unit 540 extracts the pitch and duration of the hummed query. Then, at step S603, the song retrieving unit 540 converts each of the extracted pitch and duration into the multi-level symbols. In the converting step, the pitch is converted into 5-level symbols, and the duration is converted into 3-level symbols.

At step S604, the string edit distance between the hummed query and a respective one of the plurality of songs is calculated based on the converted symbols, and a similarity between the hummed query and the respective song is determined based on the edit operations which are performed within the calculated edit distance. The edit operation includes at least one of a substitution operation, a replacement operation, an insertion operation, and a deletion operation. Further, the similarity between the hummed query and the respective song is determined based on the number of edit operations performed within the calculated edit distance. In particular, the similarity between the hummed query and the respective song increases as more substitution operations are performed within the edit distance. in addition, the similarity between the hummed query and the respective song decreases as more replacement, insertion and deletion operations are performed within the edit distance.

The method further includes displaying at least one song retrieved based on the determined similarity at step S605.

Further, the song retrieving method which is performed by using the electronic apparatus 100, 500 according to the exemplary embodiments described above may be achieved in the form of a program which includes a set of commands or instructions which are executable in various computers and may be stored in a computer-readable storage medium, such as, for example, a non-transitory computer-readable storage medium. The computer-readable storage medium may store a program command, a set of instructions, a data file, a data structure, or a combination thereof. The program commands and/or instructions which are stored in the storage medium may be specially designed or configured for the present exemplary embodiments, or may be publicly known and usable by those skilled in the computer software. The computer-readable storage medium may, for example, include magnetic media, such as a hard disk, a floppy disk and/or a magnetic tape; an optical medium, such as a compact disc read only memory (CD-ROM) and/or a digital versatile disc (DVD); a magneto-optical medium, such as a floptical disk; a ROM, a random access memory (RAM), a flash memory, or a hardware device which is specially configured to store and carry out the program command or the programmed set of instructions. The program command or the programmed set of instructions may, for example, include not only a machine language code produced by a compiler, but also a high-level language code executable by a computer by using an interpreter or the like. The hardware device may be configured to serve as one or more software modules for carrying out the operations according to one or more of the exemplary embodiments, and vice versa.

Although a few exemplary embodiments have been shown and described, it will be appreciated by those skilled in the art that changes may be made in these exemplary embodiments without departing from the principles and spirit of the present inventive concept, the scope of which is defined in the appended claims and their equivalents.

What is claimed is:

1. An electronic apparatus comprising:
a storage unit which stores a plurality of songs;
a user input unit which receives a hummed query which is inputted for retrieving a song; and
a song retrieving unit which retrieves a song based on the hummed query from among the plurality of stored songs when the hummed query is received;
wherein the song retrieving unit extracts a pitch and a duration of the hummed query, converts each of the extracted pitch and duration into multi-level symbols, calculates a string edit distance between the hummed query and one of the plurality of songs based on the symbols, and determines a similarity between the hummed query and a respective song based on one or more edit operations which are performed within the calculated string edit distance.

2. The electronic apparatus according to claim 1, wherein the song retrieving unit converts the extracted pitch into 5-level symbols and converts the extracted duration into 3-level symbols.

3. The electronic apparatus according to claim 1, wherein the edit operations comprise at least one of a substitution operation, a replacement operation, an insertion operation, and a deletion operation, and
the song retrieving unit determines the similarity between the hummed query and the respective song based on a number of edit operations which are performed within the edit distance.

4. The electronic apparatus according to claim 3, wherein the song retrieving unit determines that a degree of the similarity between the hummed query and the respective song increases as more substitution operations are performed within the edit distance.

5. The electronic apparatus according to claim 3, wherein the song retrieving unit determines that a degree of the similarity between the hummed query and the respective song decreases as more replacement, insertion or deletion operations are performed within the edit distance.

6. The electronic apparatus according to claim 1, wherein the storage unit further stores data relating to the multi-level symbols into which the extracted pitch and the extracted duration are converted, which data is generated by the song retrieving unit as a result of processing performed upon the multi-level symbols.

7. The electronic apparatus according to claim 1, further comprising a display unit which displays at least one song retrieved by the song retrieving unit based on the determined similarity.

8. The electronic apparatus according to claim 1, further comprising a user interface generating unit which generates a user interface for facilitating user retrieval of at least one song.

9. A method for retrieving a song by using an electronic apparatus, the method comprising:
storing a plurality of songs;
receiving an inputted hummed query for retrieving a song;
extracting a pitch and a duration of the hummed query;
converting each of the extracted pitch and the extracted duration into multi-level symbols; and
calculating a string edit distance between the hummed query and one of the plurality of songs based on the converted symbols, and determining a similarity between the hummed query and a respective song based on one or more edit operations which are performed within the calculated string edit distance.

10. The method according to claim 9, wherein the conversion into the symbols comprises converting the extracted pitch into 5-level symbols and converting extracted the duration into 3-level symbols.

11. The method according to claim 9, wherein the edit operations comprise at least one of a substitution operation, a replacement operation, an insertion operation, and a deletion operation, and
the determining the similarity between the hummed query and a respective song comprises determining the similarity between the hummed query and the respective song based on a number of edit operations which are performed within the edit distance.

12. The method according to claim 11, wherein the determining the similarity between the hummed query and a respective song comprises determining that a degree of the similarity between the hummed query and the respective song increases as more substitution operations are performed within the edit distance.

13. The method according to claim 11, wherein the determining the similarity between the hummed query and a respective song comprises determining that a degree of the similarity between the hummed query and the respective song decreases as more replacement, insertion or deletion operations are performed within the edit distance.

14. The method according to claim 9, further comprising storing data relating to the multi-level symbols into which the extracted pitch and the extracted duration are converted.

15. The method according to claim 9, further comprising displaying at least one song retrieved based on the determined similarity.

16. The method according to claim 9, further comprising generating and displaying a user interface for facilitating user retrieval of at least one song.

17. A non-transitory computer-readable recording medium which stores a program which includes computer-executable instructions for:
receiving an inputted hummed query for retrieving a song from among a plurality of stored songs;
extracting a pitch and a duration of the hummed query;
converting each of the extracted pitch and the extracted duration into multi-level symbols; and
calculating a string edit distance between the hummed query and one of the plurality of songs based on the converted symbols, and
determining a similarity between the hummed query and a respective song based on one or more edit operations which are performed within the calculated string edit distance.

18. An electronic apparatus comprising:
a song retrieving unit which retrieves a song based on a received hummed query from among a plurality of stored songs;
wherein the song retrieving unit extracts a pitch and a duration of the hummed query, converts the extracted pitch into a first multi-level symbol, converts the extracted duration into a second multi-level symbol, determines a similarity between the hummed query and a respective song based on the converted first and second multi-level symbols, and retrieves a song based on the determined similarity.

19. The electronic apparatus according to claim 18, further comprising a display unit which displays at least one song retrieved by the song retrieving unit based on the determined similarity.

20. The electronic apparatus according to claim 18, further comprising a user interface generating unit which generates a user interface for facilitating user retrieval of at least one song.

21. A method for retrieving a song by using an electronic apparatus, the method comprising:
receiving an inputted hummed query for retrieving a song from among a plurality of stored songs;
extracting a pitch and a duration of the hummed query;
converting the extracted pitch into a first multi-level symbol, and converting the extracted duration into a second multi-level symbol;
determining a similarity between the hummed query and a respective song based on the converted first and second multi-level symbols; and
retrieving at least one song from among the plurality of stored songs based on the determined similarity.

22. The method according to claim 21, further comprising displaying at least one song retrieved based on the determined similarity.

23. The method according to claim 21, further comprising generating and displaying a user interface for facilitating user retrieval of at least one song from among the plurality of stored songs.

* * * * *